United States Patent
Locker et al.

(10) Patent No.: US 8,397,231 B2
(45) Date of Patent: Mar. 12, 2013

(54) MONITORING OF VIRTUAL OPERATING SYSTEMS USING SPECIALIZED PACKET RECOGNIZED BY HYPERVISOR AND REROUTED TO MAINTENANCE OPERATING SYSTEM

(75) Inventors: Howard J. Locker, Cary, NC (US); Daryl Cromer, Cary, NC (US); Randall S. Springfield, Chapel Hill, NC (US); Rod D. Walterman, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1502 days.

(21) Appl. No.: 11/394,655

(22) Filed: Mar. 31, 2006

(65) Prior Publication Data
US 2007/0234355 A1   Oct. 4, 2007

(51) Int. Cl.
*G06F 9/455* (2006.01)
*G06F 11/00* (2006.01)

(52) U.S. Cl. ............................................. 718/1; 714/4.3
(58) Field of Classification Search ........ 718/1; 714/4.3
See application file for complete search history.

(56) References Cited

U.S. PATENT DOCUMENTS

| | | | |
|---|---|---|---|
| 7,561,531 B2* | 7/2009 | Lewites et al. | 370/254 |
| 2005/0081212 A1* | 4/2005 | Goud et al. | 718/107 |
| 2005/0132367 A1* | 6/2005 | Tewari et al. | 718/1 |
| 2006/0184349 A1* | 8/2006 | Goud et al. | 703/24 |
| 2007/0006307 A1* | 1/2007 | Hahn et al. | 726/22 |

OTHER PUBLICATIONS

"Extended Security Options for Standards-Based Network Management". SNMP Research International, Inc. Jul. 10, 2003.*
Yennun Huang, P. Emerald Chung, Chandra Kintala, Chung-Yih Wang and De-Ron Liang, NT-SwiFT: Softward Implemented Fault Tolerance on Windows NT, 2nd USENIX Windows NT Symposium, pp. 47-56, Aug. 3-5, 1998, last changed Apr. 10, 2002, Seattle, Washington, USA.
Reducing System Management Costs with ASF, HP, white paper, May 2003, Hewlett-Packard Development Company, L.P.
NVIDIA nForce3 Professional Media and Communication Processors: Enterprise-Class Networking for Today's Professionals, nVIDIA Technical Brief, Mar. 31, 2004, NVIDIA Corporation, Santa Clara, CA, USA.
Milojicic et al., Global Memory Management for a Multi Computer System, www.hpI.hp.com/personal/Dean_Milojicic/usenix11.pdf.

* cited by examiner

*Primary Examiner* — Jennifer To
*Assistant Examiner* — Brian Chew
(74) *Attorney, Agent, or Firm* — Ference & Associates LLC

(57) ABSTRACT

Hypervisors are a new technology in the industry that enable multiple Operating Systems to co-exist on a single client. The use of a hypervisor provides a novel approach to determining the operability of an Operating System. Each Operating System is a virtualized Operating System, with its own IP address. According to a preferred embodiment, the capability Operating System has an application that is a monitor program that runs and provides information that is sent to the maintenance Operating System. The monitor program sends a status packet at regular intervals, which contains system power state and is a confirmation that the system is not hung. If the maintenance Operating System does not receive a packet at a regular interval, or in response to a query, then the maintenance Operating System will be aware that the capability Operating System is hung and will take appropriate measures.

15 Claims, 1 Drawing Sheet

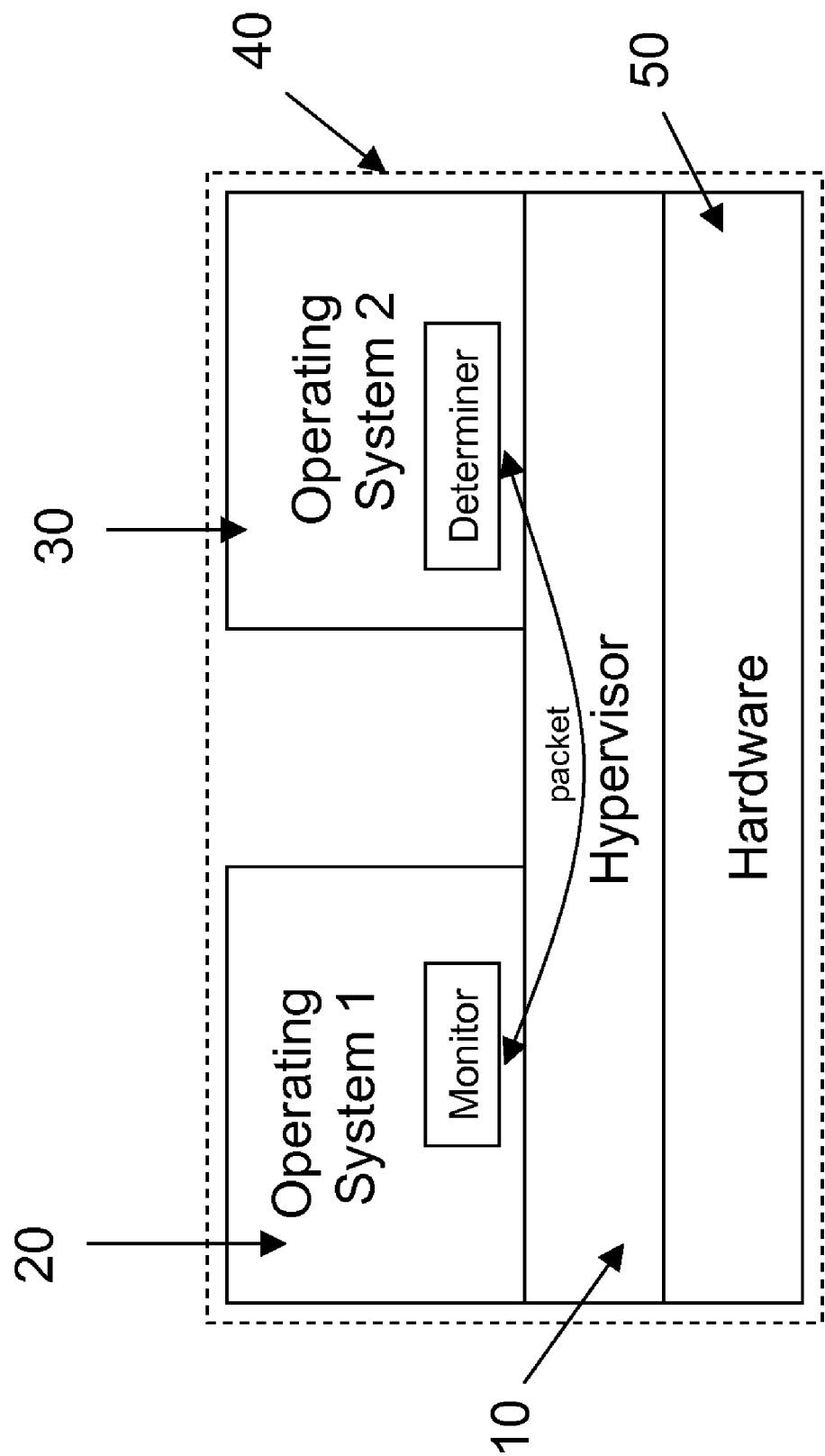

MONITORING OF VIRTUAL OPERATING SYSTEMS USING SPECIALIZED PACKET RECOGNIZED BY HYPERVISOR AND REROUTED TO MAINTENANCE OPERATING SYSTEM

FIELD OF THE INVENTION

The present invention relates generally to utilizing hypervisors to determine the status of an operating system, and in particular, whether an operating system is hung.

BACKGROUND OF THE INVENTION

As the usage of computers becomes more widespread and the technology to produce them advances, so to does the amount of communication that is enabled by them. Business runs on communication and access to data and PCs have become an essential part of the communication path. For this and other reasons, it is critically important that PCs are protected from virus attacks and have a method to recover data in the event of Operating System hang. The industry is working on technologies to enable a capability Operating System and maintenance Operating System to co-exist and use a single network. Currently, in a system using a hypervisor to maintain multiple Operating Systems on a single client, there is no way for one Operating System to know if another Operating System has hung.

Hypervisors are a new technology in the industry that enable multiple Operating Systems to co-exist on a single client. Hypervisors allow different operating systems to run on the same hardware concurrently. This has many advantages including resource isolation and ability to concurrently run different operating systems and associated applications. There are two main types of hypervisors. Type 1 hypervisors are hypervisors that run directly on the hardware. This allows good performance in each operating system vs. type 2 hypervisors where the hypervisor runs under an existing operating system. Currently, in a system using a hypervisor to maintain multiple Operating Systems on a single client, there is no way for one Operating System to know if another Operating System has hung.

Thus, there exists a need in the art for a method or system which is able to allow an Operating System in a system utilizing a hypervisor to determine whether another Operating System is operational and not in a hung state without compromising the isolation between the two Operating Systems. Such a method would ensure that communication methods and data retrieval means remain protected.

SUMMARY OF THE INVENTION

This present invention relates to a method for using hypervisors to determine whether an operating system is hung. Hypervisors are a new technology in the industry that enable multiple Operating Systems to co-exist on a single client. Hypervisors allow different operating systems to run on the same hardware concurrently. This has many advantages including resource isolation and ability to concurrently run different operating systems and associated applications. There are two main types of hypervisors. Hypervisor Type 1 is when the hypervisor runs directly on the hardware. This allows good performance in each operating system vs. type 2 hypervisor where the hypervisor runs under an existing operating system.

In summary, one aspect of the invention provides a system comprising: a hypervisor that enables more than one operating system to run concurrently; a capability operating system primarily utilized for user interaction; a maintenance operating system that has knowledge of the power state, user activity, and applications running on the capability operating system; a monitor that sends out a packet from the capability operating system that is intercepted by the hypervisor; an interceptor in the hypervisor that reroutes the packet to the maintenance operating system; and a determiner that determines a course of action if the maintenance operating system has not received a packet in a predetermined time threshold.

Another aspect of the invention provides a method comprising the steps of: using a computer with a first capability operating system and a hypervisor; creating a maintenance operating system in the computer from the hypervisor capable of having knowledge of the power state, user activity, and applications running on the capability operating system; sending out a packet from the capability operating system that is intercepted by the hypervisor; intercepting, in the hypervisor, the packet from the capability operating system and rerouting the packet to the maintenance operating system; and determining a course of action if the maintenance operating system has not received a packet in a predetermined time threshold.

A program storage device readable by machine, tangibly embodying a program of instructions executable by the machine to perform method steps, said method comprising the steps of: using a computer with a first capability operating system and a hypervisor; creating a maintenance operating system in the computer from the hypervisor capable of having knowledge of the power state, user activity, and applications running on the capability operating system; sending out a packet from the capability operating system that is intercepted by the hypervisor; intercepting, in the hypervisor, the packet from the capability operating system and rerouting the packet to the maintenance operating system; and determining a course of action if the maintenance operating system has not received a packet in a predetermined time threshold.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 illustrates an example of a Type 1 Hypervisor.

DETAILED DESCRIPTION OF THE PREFERRED EMBODIMENTS

As mentioned above, the present invention relates to a method for using hypervisors to determine whether an operating system is hung. Hypervisors are a new technology in the industry that enable multiple Operating Systems to co-exist on a single client. Hypervisors allow different operating systems to run on the same hardware concurrently. This has many advantages including resource isolation and the ability to concurrently run different operating systems and associated applications. There are two main types of hypervisors. A Type 1 Hypervisor runs directly on the hardware. Type 2 hypervisors run under an existing Operating System. Type 1 hypervisors allow good performance in each Operating System as opposed to Type 2 hypervisors. Examples of well-known hypervisors include VMWARE and XEN hypervisors.

Additional information about these hypervisors may be found at www dot xensource dot corn and www dot vmware dot com.

The instant invention utilizes a Type 1 Hypervisor in a novel way to determine whether an operating system is operational or in a hung state. This method can be expanded to many various and novel types of communication between the virtualized Operating Systems. This novel usage of a hypervisor will be detailed below in accordance with the co-existing Operating Systems. FIG. 1 details a Type 1 Hypervisor environment. Type 1 Hypervisor (item 10) environments are ideally suited for client manageability. The hypervisor abstracts both Operating Systems to the hard drive, with each Operating System able to be unaware of the other. When an Operating System writes to the hard drive, it is actually writing to a virtualized hard drive or virtual file drive. This driver writes to the hard drive as appropriate and as directed by the hypervisor. The Operating Systems are unaware of the virtualized hard drive. This allows the hypervisor to filter communications between the Operating System and the hard drive. Operating system 1 (item 20) can be the User Operating System (UOS) such as Microsoft XP. Operating System 2 (item 30) is a Service Operating System (SOS) used for client manageability such as Linux, or Microsoft Windows PE, or an additional UOS such as Microsoft XP. These two Operating Systems, and the hypervisor (item 40), run on the same hardware (item 50).

The major advantage of a Type 1 Hypervisor is that there is isolation between the maintenance Operating System and the capability Operating System. A disadvantage for this architecture is that maintenance Operating System has no means to know that the capability Operating System is functioning. Virtualization of Operating Systems usually occur with the mindset that each Operating System has no awareness of the other Operating Systems on the client. It is possible that the capability Operating System could be in a hung state and the maintenance Operating System would not be aware and unable to take action until a user invokes an action.

The instant invention addresses this disadvantage through the use of a hypervisor which provides a novel approach to determining whether an Operating System is in a hung state. The hypervisor is able to fire up an Operating System on demand, for a specific purpose, or have it running from the powering of the computer. Further, more than one Operating System can be enabled from the hypervisor, such as the maintenance Operating System and the capability Operating System detailed above. Because of the abstraction of both Operating Systems to the hardware, the hypervisor is able to control to some extent the communication of each Operating System and filter all communications from each Operating System.

Each Operating System is a virtualized Operating System, with its own IP address. According to a preferred embodiment, the capability Operating System has an application that is a monitor program that runs and provides information that is sent to the maintenance Operating System. The monitor program sends a status packet at regular intervals, which contains system power state and is a confirmation that the system is not hung. If the maintenance Operating System does not receive a packet at a regular interval, or in response to a query, then the maintenance Operating System will be aware that the capability Operating System is hung and will take appropriate measures. The concept of heartbeats and maintenance packets are known, however the key to this invention is a method to securely transmit status between the capability Operating System and the maintenance Operating System.

The capability Operating System sends a status packet out through its virtual Ethernet driver. Because the hypervisor filters communications from the Operating Systems, the hypervisor recognizes this is a special packet. Rather than sending this communication packet to the network, the hypervisor instead routes the packet to the maintenance Operating System. Neither Operating System is aware that the Ethernet packet has been redirected by the hypervisor. This can be accomplished through a novel use of the Alert Specification Forum as a communication protocol between the different Operating Systems. Alert Specification Forum can be used as a method to send a secure packet from the capability Operating System to the maintenance Operating System. General information about the Alert Specification Forum may be found at www dot dmtf dot org slash standards slash asf.

The lack of receipt of these status packets is a sign to the maintenance Operating System that the capability Operating System is hung. If the maintenance Operating System does not receive a packet at a regular interval, or in response to a query, then the maintenance Operating System will be aware that the capability Operating System is hung and will take appropriate measures. The maintenance Operating System can send another packet to the management console to reboot the capability Operating System. This method can be used for many other types of communication between the virtualized Operating Systems as well.

In essence, the capability Operating System sends a packet to the IP address of the maintenance Operating System which contains critical information. The packet may be a UDP with the payload and contains a nonce and is encrypted via standard techniques to prevent attacks. Encryption of the packets is necessary because the capability Operating System does not realize that it is being virtualized. Also, encryption protects against virus attacks that may be on the maintenance Operating System.

Transmittal of the packet may be accomplished by assigning a port that is only accessible from within the hypervisor as a communication port. The hypervisor recognizes the packet and sends it to the maintenance Operating System. The maintenance Operating System receives the packet, checks its validity, and sends it to the appropriate application. It is also possible for the maintenance Operating System to query the capability Operating System on a policy set time interval. Failure to respond due to the capability Operating System not functioning can also indicate that an action is required by the maintenance Operating System.

The present invention is not limited to determining the operability of an Operating System. Rather, it can be expanded to handle numerous other Operating System to Operating System types of communication such as power up/power down, etc. This communication between virtualized Operating Systems could also be expanded to work with Intel's Active Management Technology, or many other communication or management protocols that are well-known in the art. General information about Intel's Active Management Technology may be found at www dot intel dot corn slash technology slash manage slash iamt.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system comprising:
   one or more processors;
   a capability operating system primarily utilized for user interaction;
   a maintenance operating system comprising a determiner;
   a monitor implemented in said capability operating system that sends out specialized packets addressed to a network destination;
   a hypervisor that enables the capability operating system and the maintenance operating system to run concurrently, the hypervisor comprising:
      an interceptor that recognizes the specialized packets and reroutes the specialized packets addressed to the network destination to the maintenance operating system;
   wherein the determiner determines a course of in response to one or more of:
      at least one specialized packet not being received from the capability operating system, wherein the course of action comprises at least one other packet being sent out by the maintenance operating system to a management console to reboot the capability operating system; and
      information conveyed by a specialized packet received by said maintenance operating system.

2. The system of claim 1, wherein at least one of the specialized packets is an Ethernet packet that holds status information.

3. The system of claim 2, wherein at least one of the specialized packets is an encrypted packet that contains information about the capability operating system, wherein the information comprises information related to power state, user activity, or applications running on the capability operating system.

4. The system of claim 3, wherein at least one of the specialized packets is an Alert Specification Forum packet.

5. The system of claim 3, wherein the determiner signals the maintenance operating system that the capability operating system is hung when at least one specialized packet has not been received within a predetermined time threshold.

6. The system of claim 5, wherein the threshold is selected from time of day, specific time intervals, or user-set thresholds.

7. The system of claim 1, wherein the hypervisor filters communication between the capability operating system and the maintenance operating system.

8. A method comprising:
   operating a computer with a first capability operating system, a maintenance operating system and a hypervisor, wherein the hypervisor enables the capability operating system and the maintenance operating system to run concurrently;
   sending out specialized packets from the capability operating system addressed to a network destination;
   intercepting the specialized packets from the capability operating system addressed to the network destination and rerouting the specialized packets to the maintenance operating system with the hypervisor in response to the hypervisor recognizing the specialized packets; and
   determining a course of action based upon in response to one or more of:
      at least one specialized packet not being received from the capability operating system, wherein the course of action comprises at least one other packet being sent out by the maintenance operating system to a management console to reboot the capability operating system; and
      information conveyed by a specialized packet received by said maintenance operating system.

9. The method of claim 8, wherein at least one of the specialized packets is an Ethernet packet that holds status information.

10. The method of claim 9, wherein at least one of the specialized packets is an encrypted packet that contains information about the capability operating system, wherein the information comprises information related to power state, user activity, and applications running on the capability operating system.

11. The method of claim 10, wherein at least one of the specialized packets is an Alert Specification Forum packet.

12. The method of claim 10, further comprising signalling the maintenance operating system that the capability operating system is hung when at least one specialized packet has not been received within a predetermined time threshold.

13. The method of claim 12, wherein the threshold is selected from time of day, specific time intervals, or user-set thresholds.

14. The method of claim 8, wherein the hypervisor filters communication from each operating system.

15. A program storage device comprising a memory readable by machine, tangibly embodying a program of instructions executable by the machine to perform steps comprising:
   operating a computer with a first capability operating system, a maintenance operating system and a hypervisor, wherein the hypervisor enables the capability operating system and the maintenance operating system to run concurrently;
   sending out specialized packets from the capability operating system addressed to a network destination;
   intercepting the specialized packets from the capability operating system addressed to the network destination and rerouting the specialized packets to the maintenance operating system with the hypervisor in response to the hypervisor recognizing the specialized packets; and
   determining a course of action based upon in response to one or more of:
      at least one specialized packet not being received from the capability operating system, wherein the course of action comprises at least one other packet being sent out by the maintenance operating system to a management console to reboot the capability operating system; and
      information conveyed by a specialized packet received by said maintenance operating system.

* * * * *